United States Patent [19]
Kay

[11] Patent Number: 5,812,935
[45] Date of Patent: *Sep. 22, 1998

[54] CELLULAR SYSTEM EMPLOYING BASE STATION TRANSMIT DIVERSITY ACCORDING TO TRANSMISSION QUALITY LEVEL

[75] Inventor: Stanley E. Kay, Rockville, Md.

[73] Assignee: Hughes Electronics, Los Angeles, Calif.

[*] Notice: The term of this patent shall not extend beyond the expiration date of Pat. No. 5,542,107.

[21] Appl. No.: 397,804

[22] Filed: Mar. 3, 1995

Related U.S. Application Data

[63] Continuation of Ser. No. 62,521, May 17, 1993, abandoned.

[51] Int. Cl.$^6$ ................................................. H04Q 7/32
[52] U.S. Cl. .......................... 455/56.1; 455/69; 455/67.1; 455/101; 455/115; 379/58; 375/299
[58] Field of Search ................................ 455/101, 33.1, 455/33.3, 33.4, 59, 63, 69, 103, 105, 115, 52.3, 56.1, 52.1, 54.1, 67.1; 375/38, 40, 347, 299; 379/58

[56] References Cited

U.S. PATENT DOCUMENTS

| | | |
|---|---|---|
| 3,693,088 | 9/1972 | Rustako, Jr. et al. ................. 455/52.3 |
| 4,661,993 | 4/1987 | Leland et al. ........................... 455/103 |
| 4,891,812 | 1/1990 | Bocci et al. ........................ 375/347 X |
| 5,257,401 | 10/1993 | Dahlin et al. ......................... 455/63 X |
| 5,280,631 | 1/1994 | Nakahi et al. ...................... 455/101 X |

*Primary Examiner*—Reinhard J. Eisenzopf
*Assistant Examiner*—Philip J. Sobutka
*Attorney, Agent, or Firm*—John T. Whelan; Wanda Denson-Low

[57] ABSTRACT

A cellular system has base stations in which diversity transmission is controllably employed to improve voice communications as needed. Normal signal transmission is employed in each voice channel unless it is detected that quality has dropped to a point where diversity transmission is needed to enhance the quality. When it is detected that a voice channel needs diversity transmission, a diversity (delayed) signal is automatically transmitted for that channel over an independent path. A common diversity transmitter is employed for all channels, whereas individual transmitters are employed for the normally transmitted signals in the respective voice channels.

24 Claims, 6 Drawing Sheets

CELLULAR SYSTEM EMPLOYING BASE STATION TRANSMIT DIVERSITY ACCORDING TO TRANSMISSION QUALITY LEVEL

This is a continuation of application Ser. No. 08/062,521, filed May 17, 1993, now abandoned.

BACKGROUND OF THE INVENTION

The present invention relates to cellular communication systems and more particularly to such systems in which base station tranmit diversity is employed.

In cellular telephone communication systems, radio communication occurs between fixed equipment at a base station (cell sites) and mobile units within the cell. The signal path from the base to the mobile units is referred to as the "forward" path, while that in the opposite direction is the "reverse" path. Cellular systems are limited by the capability of mobile telephones to receive information in the presence of interference. The key performance measure is the minimum ratio of signal power to interference power that permits acceptable communication quality.

In one method of compliance with Telecommunications Industry Association (TIA) standards, an equalizer is required to be integrated into the mobile unit circuitry. The equalizer must be capable of operating well when receiving signals through two distinct paths separated in time by up to 41 $\mu$S (a symbol duration). The intent of the equalizer is to mitigate the effects of delay spread as it arises in the transmission environment of cellular telephones. Delay spread is the period over which a signal transmitted at an instant is spread over time by the communication channel.

For appropriate equalizer architectures, excellent performance occurs when the channel exhibits particular characteristics. Specifically, the equalizer performs very well when the channel appears to have consisted of two paths of equal average power, separated in time by a symbol duration. This improved performance results from a combination of two factors: (a) the diversity between the two paths (i.e., the low probability that they will fade simultaneously relative to the individual probabilities of fading), and (b) the minimal level of Inter-Symbol Interference (ISI) that occurs when the paths are separated by exactly a symbol duration.

In typical operating environments, it is possible that paths with the desired characteristics will occur naturally. Unfortunately, such circumstances rarely arise, and delay spreads are typically negligible in comparison to the symbol duration.

In previous system base station equipment, diversity reception is typically used to improve mobile-to-base (reverse) channel performance. In a previously filed patent application Ser. No. 08/053,173 filed Apr. 26, 1993 entitled "TIME DIVISION MULTIPLE ACCESS CELLULAR COMMUNICATION SYSTEM AND METHOD EMPLOYING BASE STATION DIVERSITY TRANSMISSION" by John Watson et al., a cellular system is disclosed in which forward diversity signal transmission is employed from a base station to improve system communication quality.

In the Parr diversity transmission cellular system, forward diversity transmission is continuously employed to achieve improved system communication quality. Normally, only a relatively small percentage of total system communications are sufficiently degraded in quality that a need exists for quality enhancement by forward diversity transmission. Accordingly, the Parr system employs greater hardware and software resources than might otherwise be required if only those system communications requiring quality enhancement were to be conducted with forward diversity transmission.

SUMMARY OF THE INVENTION

The present invention accordingly is directed to a diversity cellular transmission system in which quality improvement is provided for those system communications that have need for improvement thereby enabling system quality improvement and/or extended system capacity with greater economy of manufacture and greater efficiency of use.

A cellular system comprises means for generating a first low frequency signal corresponding to an input voice signal in each of a plurality of voice channels and means for processing the first low frequency signal to form a first radio frequency signal corresponding thereto in each of the voice channels. Means are provided for transmitting the first radio frequency signal for each of the voice channels including respective transmitter means therefor.

Means are provided for detecting a loss of voice quality in the transmitted first radio frequency signal in any of the voice channels to a level where transmit diversity is needed. Means are provided for generating a second radio frequency signal corresponding to but time delayed from any first radio frequency signal.

Means are provided for coupling to said generating means the first radio frequency signal from any of the transmitter means for which the detecting means detects that transmit diversity is needed. Additional means are provided for transmitting any second radio frequency signal, and antenna means are provided for transmitting the first and second radio frequency signals from the transmitting means over independent transmission paths.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate a preferred embodiment of the invention and together with the description provide an explanation of the objects, advantages and principles of the invention. In the drawings.

DESCRIPTION OF THE INVENTION

In accordance with the present invention, a cellular system employs base station transmit diversity as needed to enhance transmission quality level. An example of the present preferred embodiment of the invention is illustrated in the accompanying drawings and will now be described in detail.

Figure 1:
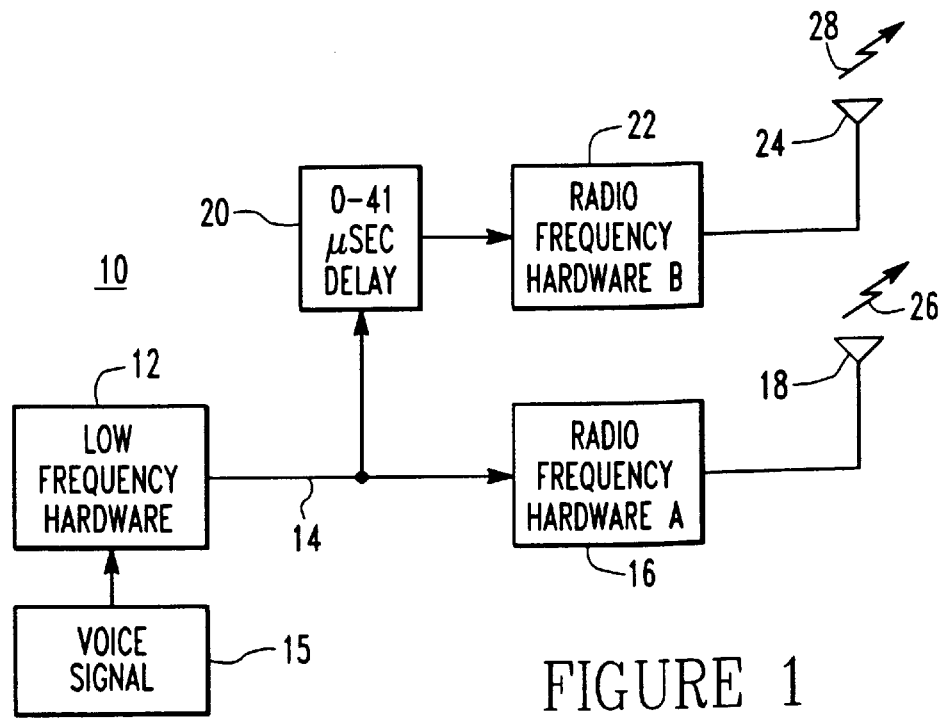
FIG. 1 is a block diagram representing a cellular base station arranged to provide forward diversity transmission to mobile receivers.
Figure 3:
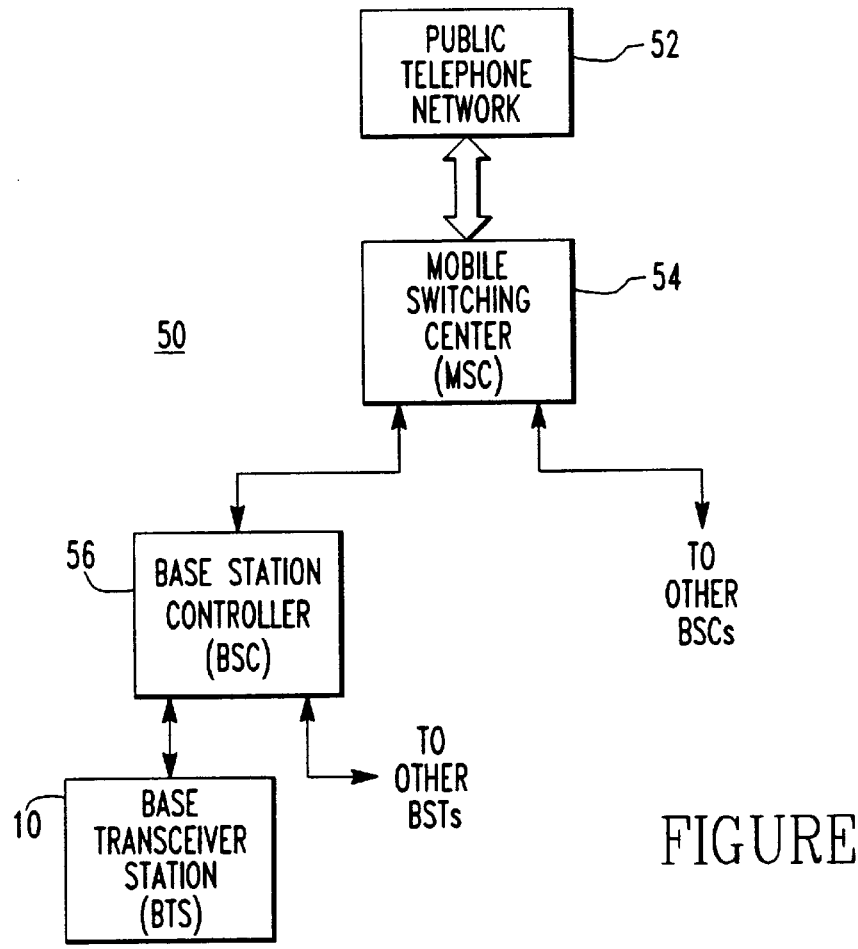
FIG. 3 is a block diagram of a cellular system in which forward diversity transmission is provided in accordance with the present invention.

In FIG. 1, a simplified block diagram is shown for a digital cellular base transceiver station 10 that employs forward diversity transmission. The digital cellular base transceiver station 10 operates in a cellular, time division multiplex access (TDMA) system 50 (FIG. 3) in accordance with the invention and includes low frequency hardware 12 that receives an input voice signal 15 for transmission. The low frequency hardware 12 includes multiple communication or voice channels, but it is illustrated for purposes of description as having a single channel in which the hardware digitally processes the input signal 15 to generate a ditigal baseband output 14.

At a predetermined point in the transmission circuitry, the processed input signal is divided into two paths. The signal division is done while the signal is at low frequencies. In other applications of the invention, signal division can be performed at an upconverted frequency level, such as the radio frequency level.

Accordingly, the low frequency signal output 14 is directly applied through a first circuit channel to radio frequency hardware 16 for upconversion to radio frequency, power amplification and forward transmission from an antenna 18. In addition, the low frequency signal output 14 is applied to a time delay circuit 20, which can operate with a fixed time delay but operates in the preferred embodiment with a selectable variable time delay up to 41 microseconds in a second circuit channel.

In turn, the delayed, low frequency signal output is applied from the time delay circuit 20 to radio frequency hardware 22 for upconversion, power amplification and forward transmission from an antenna 24 that may be suitably located in spaced relation on the same tower as an antenna 18. Alternatively, separate towers can be provided for the antennas 18 and 24. Generally, time spaced signals 26 and 28 are transmitted to achieve relatively good independence between the signal transmission paths, i.e. to achieve relatively good signal diversity based on transmitted signals with prestructured time separation and transmission path independence.

Figure 2:
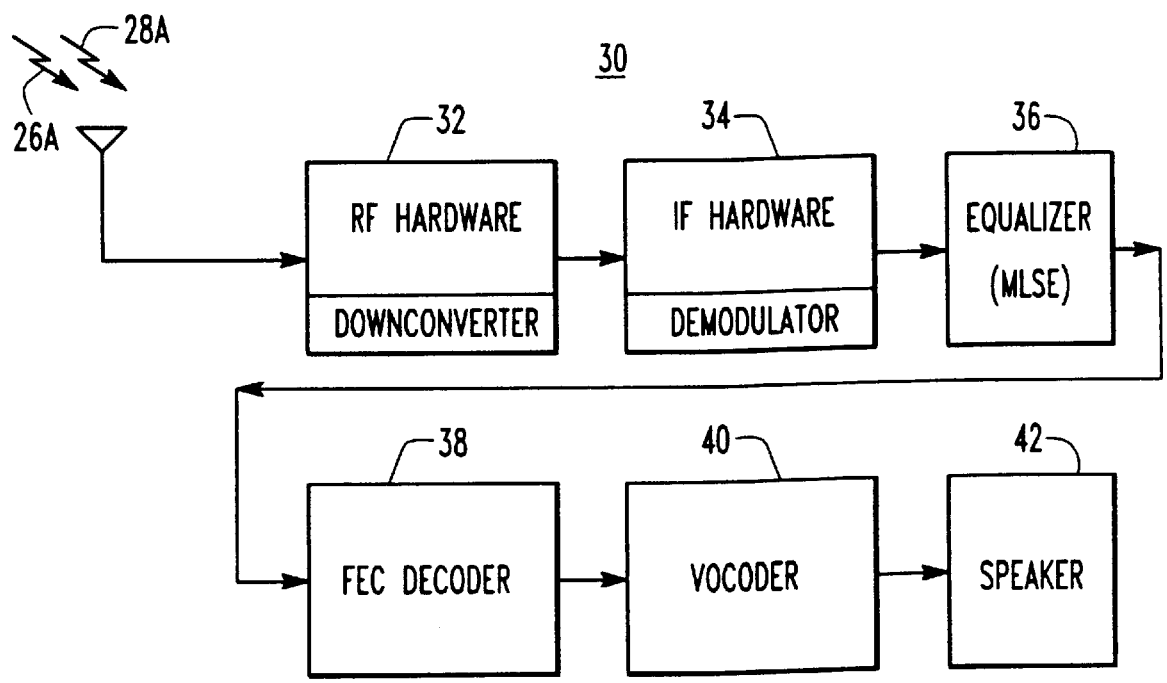
FIG. 2 is a block diagram of a mobile cellular receiver that receives signals from the base station of FIG. 1.

To achieve transmission path independence, the signals 26 and 28 are transmitted to traverse different paths to the mobile receiver. Thus, path independence is achieved by transmitting the signals through physically separated antennas as described hereinabove, or by an appropriate electronic (or other) technique such as polarization variation. Accordingly, the signal 26 and the signal 28, which is delayed, are transmitted as diversity signals with intentionally structured time separation to a digital mobile telephone receiver 30 (FIG. 2) in the station reception area.

The transmitted signals 26 and 28 are received as diversity signals 26A and 28A which are respectively at least slightly different from the transmitted signals 26 and 28 due to channel conditions. The received signals 26A and 28A are summed and applied to radio frequency hardware 32 that processes the signals 26A and 28A to separate and downconvert them for application to intermediate frequency (IF) hardware 34.

The signals are demodulated by the IF hardware 34 and coupled to an equalizer 36. After equalization, conventional signal processing is provided by a forward error correcting (FEC) decoder 38 and a vocoder 40 that is coupled to a speaker 42.

The equalizer 36 in the present embodiment is a maximum likelihood sequential estimator that conventionally operates on diversity signals that are delayed by natural channel conditions. As previously indicated, equalizer performance improves the quality of reception through reduction of error rates when there are two uncorrelated, time-separated fading paths, and especially when the delay between the paths is a symbol duration.

The equalizer 36 also is intended to operate on diversity signals that are time separated relative to each other by circuitry in the base station 10 prior to forward transmission as described hereinabove. Generally, the equalizer 36 resolves the artificially imposed delay spread by first separating the two independent fading signals summed at the receiving antenna and then optimally combining the signals in a manner like that applied to conventional diversity signals.

Accordingly, mobile receiver performance is enabled to be improved through an artificial creation of two time-separated signal paths from a base station.

The cellular system 50 (FIG. 3) includes a mobile switching center (MSC) 54 that is linked to a public telephone network 52. The MSC 54 is linked to a base station controller (BSC) 56 and a plurality of other BSCs (not specifically shown). The base transceiver station 10, and other similar stations (not specifically shown) are coupled to the BSC 56 for channel communications and for base station control purposes.

Figure 4:
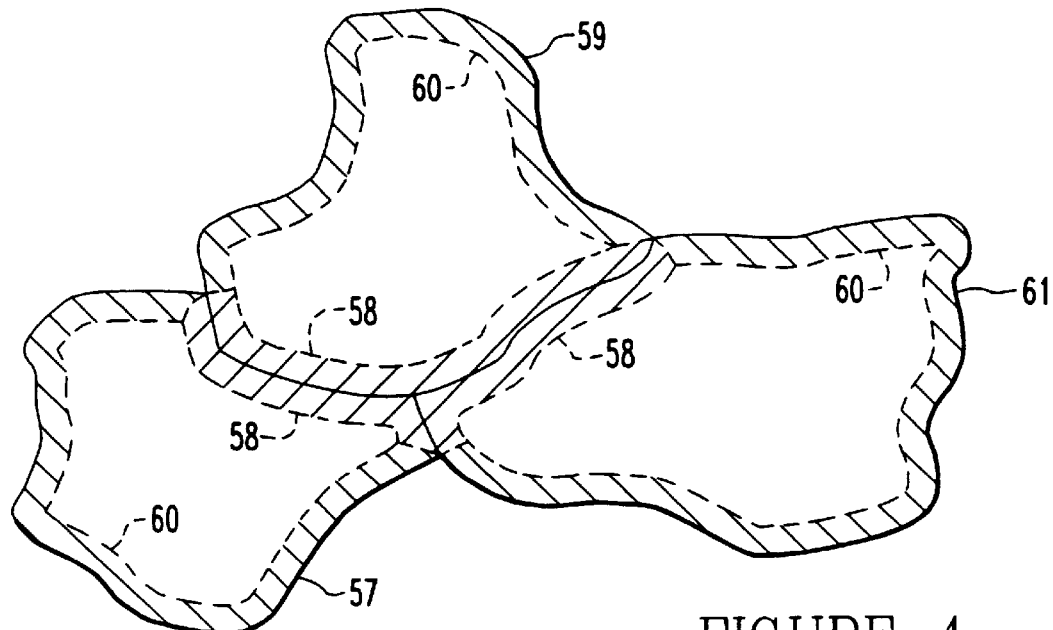
FIG. 4 schematically represents a geographic portion of a cellular system to illustrate circumstances under which diversity transmission is typically needed for improvement in communication quality.

In general, the present invention is directed to controlling the circumstances under which forward diversity transmission is applied to achieve cost effective improvement in communication quality and/or system capacity. Normally, as shown for illustrative cells 57, 59, and 61 in FIG. 4, improvement in voice quality becomes needed as a mobile receiver enters cell interface areas 58 and cell border areas 60. As a mobile interface unit moves through an area 58, communication hand-off conventionally occurs from the outgoing cellular base station to the incoming cellular base station in order to maintain voice quality.

Figure 5:
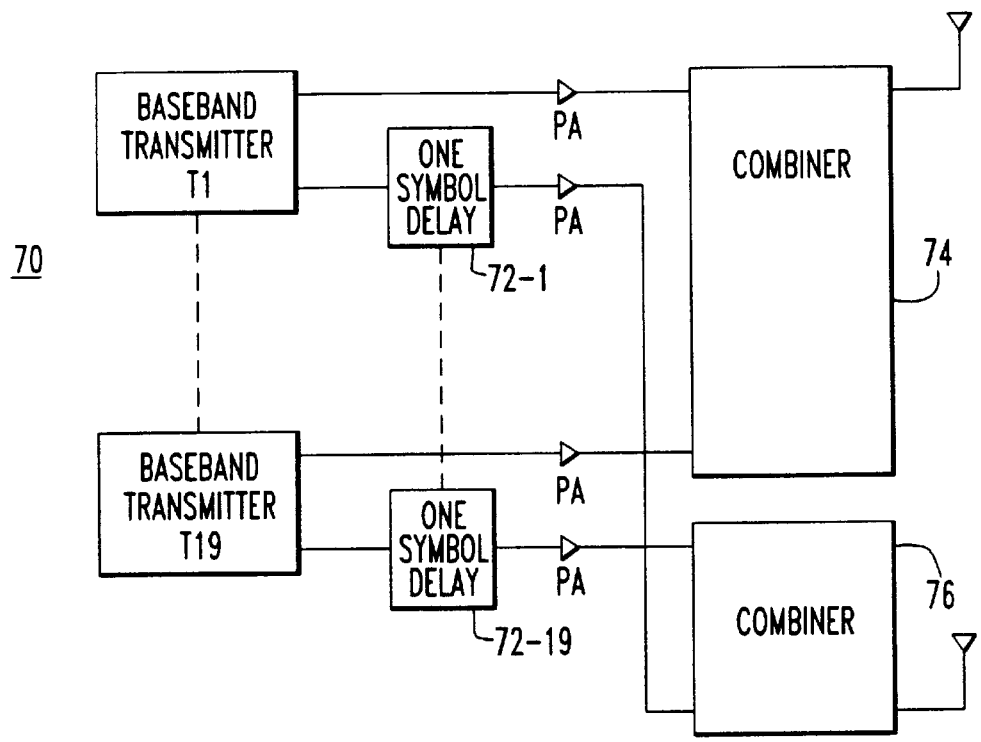
FIG. 5 is a block diagram for a base station that is conventionally arranged to provide forward diversity transmission.

As schematically illustrated by a representative prior art base station 70 in FIG. 5, the conventional transmitter hardware arrangement for diversity transmission includes separate baseband transmitters T1 through T19 for a 19-channel base station. A delay circuit 72 is provided for each transmitter T1–T19.

All nineteen channel signals are combined for transmission in a 19-channel combiner 74. All nineteen channel delay signals are similarly combined for transmission in a 19-channel delay signal combiner 76. As a result, in this prior art example, thirty-eight power amplifiers are required for the nineteen transmission signal channels and the nineteen transmission signal delay channels.

In accordance with the present invention, a base station 100 (FIG. 6) includes a plurality of baseband transmitters R1–R19 that are coupled to a 19-channel combiner 102 to transmit voice signals in the respective channels in the normal manner. In addition, another baseband transmitter R20 is coupled to a single autotuning combiner to transmit a voice signal, that is delayed preferably by one symbol, for any channel determined to have adverse signal conditions that creates a need for diversity transmission. The use of autotuning combiners for the baseband transmitter R20 assures that it can operate on any channel in the band.

Figure 6:
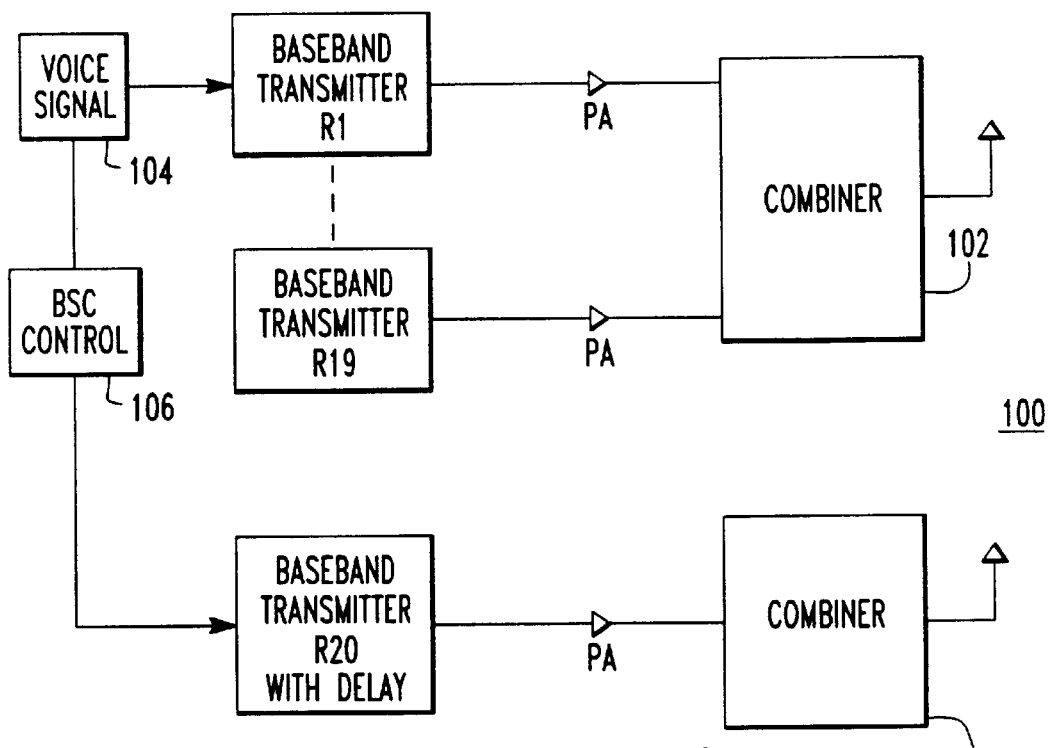
FIG. 6 is a block diagram for a base station that is arranged to provide improved diversity transmission in accordance with the invention.

As illustrated in FIG. 6, a voice signal 104 coupled to the baseband transmitter R1 may become degraded in mobile unit reception quality to the point that diversity transmission is detected to be needed. Thus, upon detection of the need, a BSC control 106 further couples the voice signal 104 to the delay transmitter R20. Diversity signals are thus transmitted by the combiners 102 and 105 for the R1 baseband transmitter. In this manner, diversity transmission is only applied to the channel or channels when a channel need arises for quality improvement as opposed to applying diversity transmission to all channels at all times.

Prior diversity transmission required doubling the number of RF combiners and power amplifiers to achieve its benefits, whereas the present invention requires only an addition of one or two units per cell thus offering a major cost savings.

Figure 9:
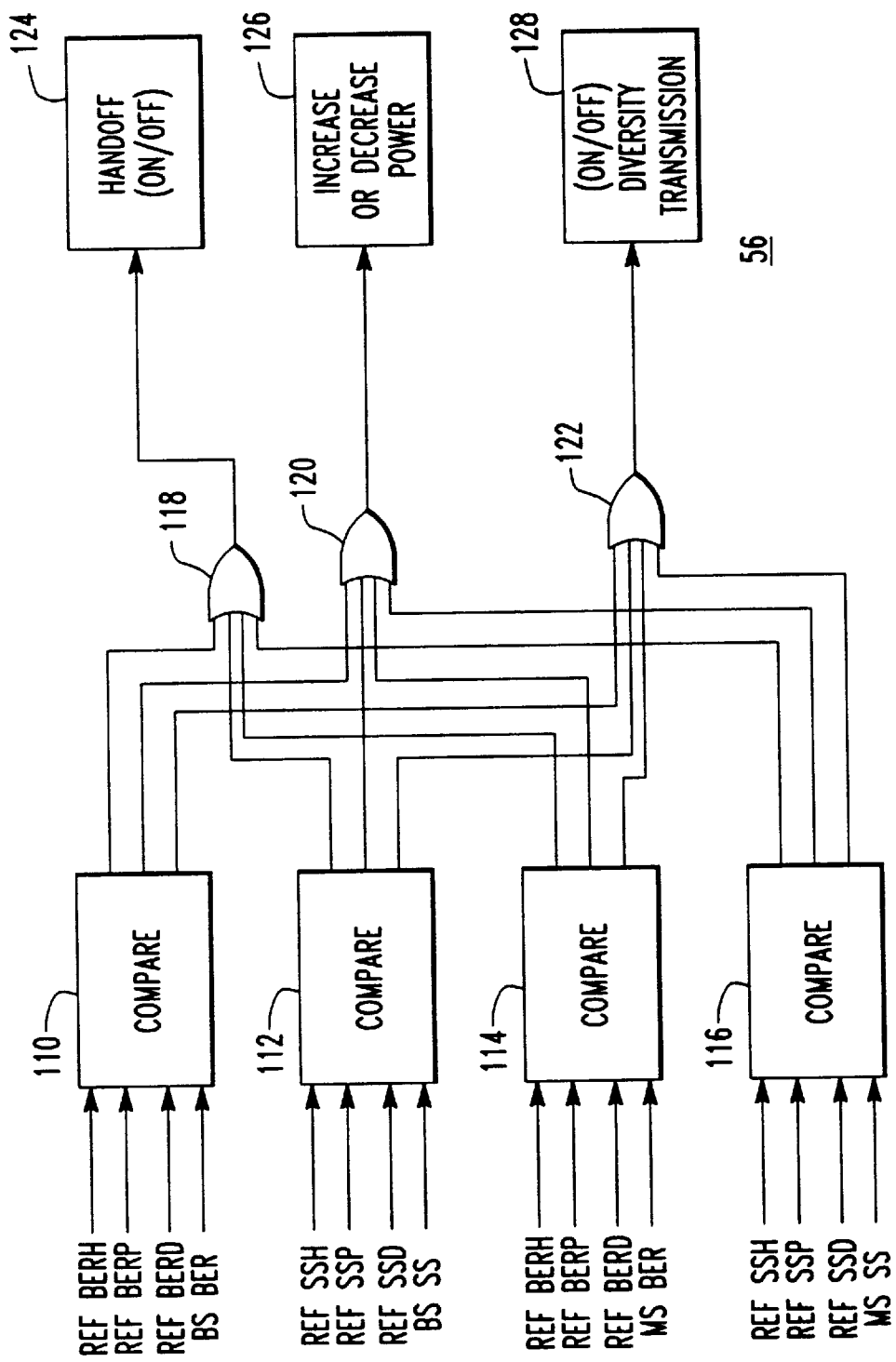
FIG. 9 is a functional block diagram for control logic in a base station controller (BSC) that provides ON/Off control of diversity transmission in accordance with the invention.

The BSC 56 determines when diversity transmission is to be applied to each BS channel by generating a control signal that is transmitted to the base station 10 to connect or disconnect the channel voice signal to or from the delay transmitter R20. As shown in FIG. 9, the BSC 56 includes a logic system that employs respective comparators 110 and 112 for respectively comparing reference or threshold bit error rates (BER) with the measured base station (BS) BER and the measured mobile station BER. Different thresholds may be employed according to whether a logical determination is being made for a cell hand-off, for a power change, or for diversity transmission.

Comparators 114 and 116 similarly compare reference signal strength (SS) values with the measured base station (BS) and mobile station (MS) signal strength values.

All of the hand-off logic outputs are connected to element 118 to generate a hand-off ON/OFF signal 124 for the linked mobile unit and the adjacent cell base station for any channel requiring a hand-off or a hand-off termination, as indicated by the output of any one of the comparators 110–116. A conventional hand-off control system implements any hand-off decision.

Similarly, element 120 receives logic outputs from the comparators 110–116 and generates a mobile unit POWER increase or decrease signal 126 for any channel determined by the comparators 110–116 as needing a power change.

In applying the present invention, element 122 receives outputs from the comparators 110–116 and generates a base station DIVERSITY TRANSMISSION ON/OFF signal 128 for any channel determined to have need for quality upgrading or return to nondiversity operation. The signal 128 is coupled to the base station circuitry to control diversity transmission as described hereinabove.

Figure 10A:
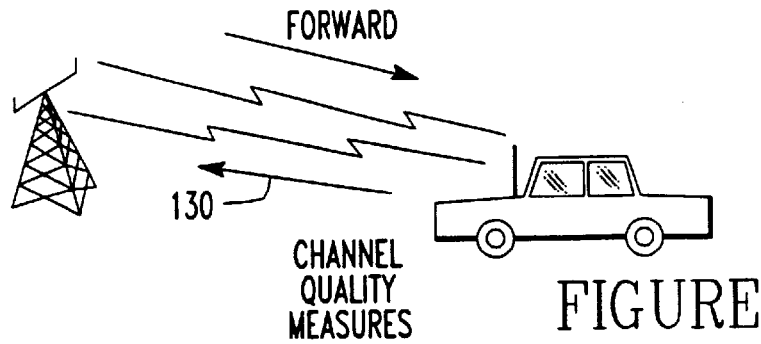
FIG. 10A schematically represents a measurement of forward channel quality for the BSC control of FIG. 7.

As shown in FIG. 10A, channel quality measurements 130 are returned from mobile units to the base station for use in the BSC logic system of FIG. 9.

Figure 10B:
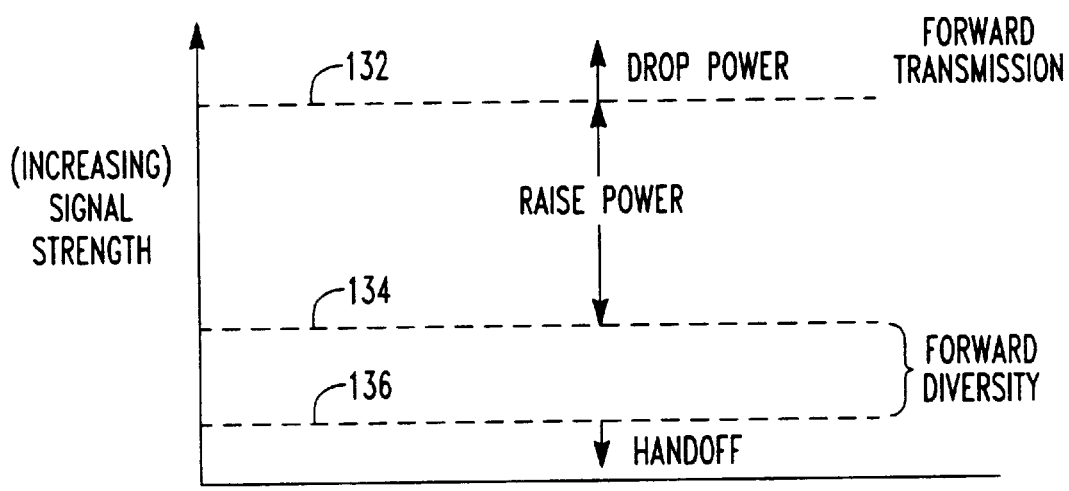
FIGS. 10B and 10C respectively show a signal strength chart and a Bit Error Rate chart that illustrate the circumstances under which forward diversity transmission is turned OFF and ON in accordance with the invention.

FIG. 10B graphically illustrates how the decreased control actions relate to signal strength (SS). Thus, power is decreased above signal level 132. Between signal level 134 and signal level 132, power is increased. Forward diversity is applied between the signal level 134 and signal level 136. Below the signal level 136, hand-off is initiated.

Figure 10C:
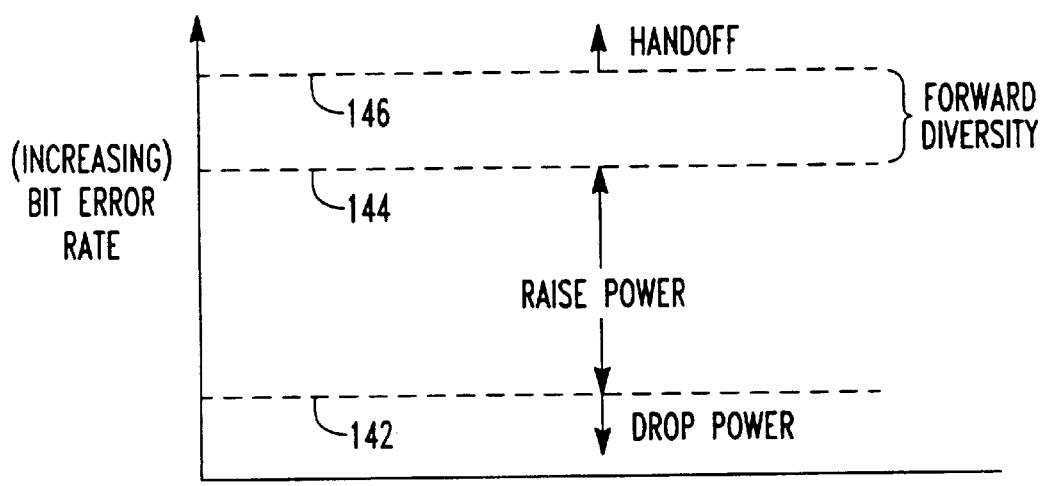

FIG. 10C, similarly graphically illustrates how the described control actions relate to bit error rate (BER) for BER levels 142, 144, and 146.

In implementing the logic system of FIG. 9, a conventional algorithm operates in conventional cellular systems for hand-off and power control purposes. For digital systems, the hand-off algorithm uses Mobile Assisted Hand-off (MAHO) measurements to assess the quality of the forward link. When the quality of the link falls below a certain value, the hand-off process begins.

Variations of this logic are possible which use dynamically adjustable thresholds or which enable forward diversity when a combination of signal strength and BER conditions exists, rather than processing them separately.

With the present invention, the logic employed in the conventional algorithm is modified as described hereinabove. When the link quality degrades to a system-specific level as described, the transmit diversity is enabled for that particular mobile station.

Once diversity transmission is initiated for a channel, the forward voice is sent to two radio channel transmitter units, the one it has been using until then and the delay baseband transmitter R20. The transmitter R20 preferably delays the signal one symbol and sends it to the mobile station through a second antenna as previously indicated. Simultaneously, the power amplifier for each of the two channels is dropped to half power to maintain the same total power from the cell site and thereby conform to FCC power level limits.

Figure 7:
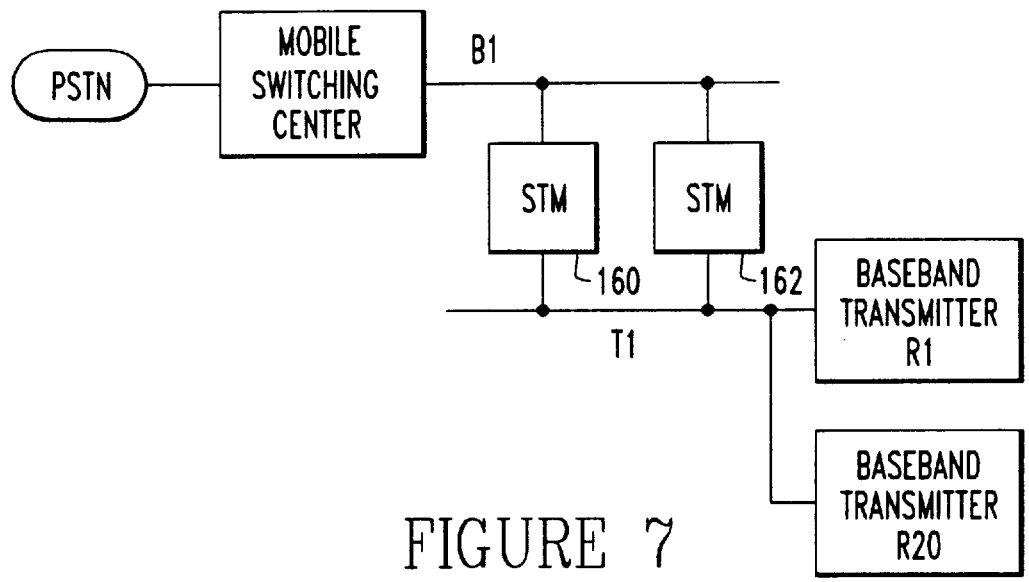
FIGS. 7 and 8 show illustrative alternative schemes for connecting a single signal to two or more transmitters for transmission to a mobile receiver.
Figure 8:
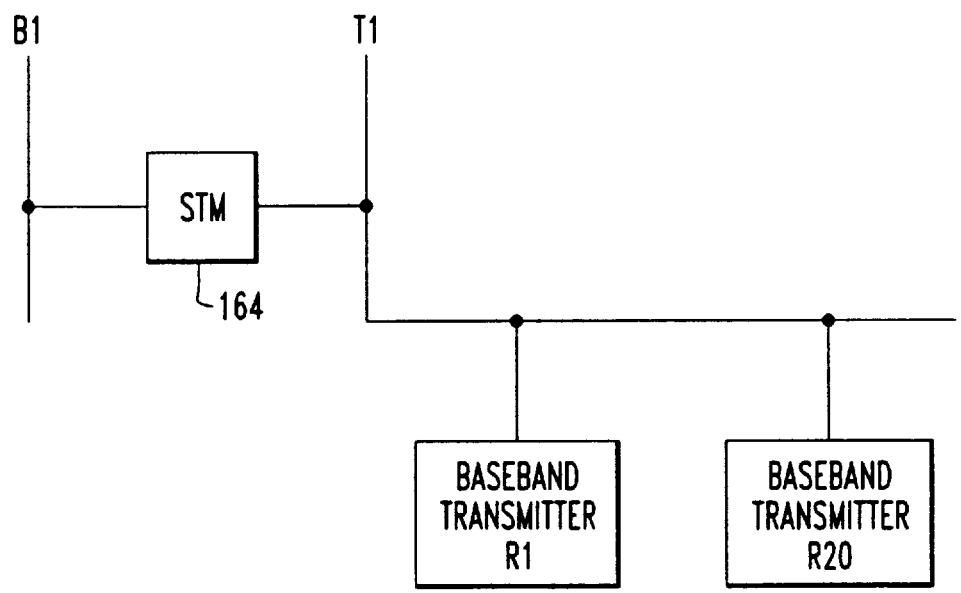

To send the same forward voice signal to more than one mobile station in the preferred embodiment, two switching transcoder modules (STM) 160 and 162 are connected to the same telephone trunk as shown in FIG. 7. Alternatively, the output of a single STM 164 can be connected to two baseband transmitters as shown in FIG. 8.

The invention concept can be further extended to allow the baseband transmitter R20 to handle up to three mobile units with transmit diversity. In this case the three mobile units must be on the same frequency, which, in turn, may require intracell hand-off prior to using transmit diversity.

The foregoing description of the preferred embodiment has been presented to illustrate the invention. It is not intended to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

What is claimed is:

1. In a radio communications system having at least one fixed base station and a plurality of remote stations, the base station transmitting signals to the remote stations over one or more forward radio channels each forward channel being assigned to at least one of the remote stations, and the remote stations transmitting signals to the base station over one or more reverse radio channels, a method for improving the quality of transmissions from the base station to a remote station comprising:

monitoring the quality of the signals received over a reverse channel from a selected one of the plurality of remote stations;

identifying a forward channel associated with the selected remote station;

receiving from the selected remote station a report of the quality of signals received by the selected remote station from the base station on the forward channel; and employing diversity transmission for transmitting signals from the base station to the selected remote station over the identified forward channel in response to the monitored quality of the received signals and the report received from the selected remote station.

2. The method of claim 1 wherein the step of monitoring the quality comprises measuring the bit error rate of signals received from the selected remote station.

3. The method of claim 1 wherein the step of monitoring the quality comprises measuring the signal strength of signals received from the selected remote station.

4. The method of claim 1 wherein the step of employing diversity transmission comprises employing time diversity.

5. The method of claim 1 wherein the step of employing diversity transmission comprises transmitting the signals from two physically separated antennas.

6. The method of claim 1 wherein the report comprises a bit error rate measurement of the forward channel.

7. The method of claim 1 wherein the report comprises a signal strength measurement of the forward channel.

8. The method of claim 1 wherein the step of employing diversity transmission comprises comparing the quality indicated in the report from the selected mobile station to a threshold quality and employing diversity transmission only if the monitored quality is less than the threshold quality.

9. The method of claim 1 wherein the signals comprise digitized speech.

10. The method of claim 1 wherein the step of employing diversity transmission comprises comparing the monitored quality to a threshold quality and employing diversity transmission only if the monitored quality is less than the threshold quality.

11. The method of claim 10 further comprising the step of comparing the monitored quality to a second threshold quality lower than the first threshold quality and increasing the transmission power of the base station over the identified forward channel if the monitored quality is less than the second threshold quality.

12. In a radio communications system having a fixed base station and a plurality of remote stations, the base station transmitting signals to the remote stations over one or more forward radio channels each forward channel being assigned to at least one of the remote stations, and the remote stations transmitting signals to the base station over one or more reverse radio channels, the base station having a plurality of primary transmitters each assigned to at least one forward channel and at least one diversity transmitter, the diversity transmitters being fewer in number than the primary transmitters, a method for improving the quality of transmissions from the base station to a remote station comprising:

monitoring the quality of the radio signal path between the base station and a selected one of the plurality of remote stations;

identifying the forward channel associated with the monitored radio signal path associated with the selected remote station;

assigning a diversity transmitter of the at least one diversity transmitters to the identified forward channel to augment the assigned primary transmitter for the identified forward channel in response to the monitored quality of the radio signal path; and transmitting signals from the base station to the selected remote station over the identified forward channel using both the primary and the assigned diversity transmitters simultaneously.

13. The method of claim 12 wherein the step of monitoring the quality comprises measuring the bit error rate of signals received from the selected mobile station.

14. The method of claim 12 wherein the step of monitoring the quality comprises measuring the signal strength of signals received from the selected mobile station.

15. The method of claim 12 wherein the step of transmitting signals using both the primary and diversity transmitters comprises transmitting with time diversity.

16. The method of claim 12 wherein the step of transmitting signals using both the primary and the assigned diversity transmitters comprises transmitting the signals from two physically separated antennas.

17. The method of claim 12 wherein the signals comprise digitized speech.

18. The method of claim 12 wherein the step of assigning a diversity transmitter comprises comparing the monitored quality to a threshold quality and assigning a diversity transmitter only if the monitored quality is less than the threshold quality.

19. The method of claim 18 further comprising the step of comparing the monitored quality to a second threshold quality lower than the first threshold quality and increasing the transmission power of the base station over the identified forward channel if the monitored quality is less than the second threshold quality.

20. The method of claim 12 wherein the step of monitoring the quality comprises:

receiving from the selected mobile station a report of the quality of signals received by the selected mobile station from the base station on the forward channel.

21. The method of claim 20 wherein the report comprises a bit error rate measurement of the forward channel.

22. The method of claim 20 wherein the report comprises a signal strength measurement of the forward channel.

23. The method of claim 20 wherein the step of assigning a diversity transmitter comprises comparing the quality indicated in the report from the selected mobile station to a threshold quality and assigning a diversity transmitter only if the monitored quality is less than the threshold quality.

24. The method of claim 20:

wherein the step of monitoring the quality comprises monitoring the quality of the signals received over a reverse channel from the selected mobile station; and wherein the step of assigning a diversity transmitter comprises assigning a diversity transmitter for transmitting signals from the base station to the selected mobile station over the identified forward channel in response to the monitored quality of the received signals and the report received from the selected mobile station.

* * * * *